United States Patent
Lee et al.

(10) Patent No.: US 6,900,846 B2
(45) Date of Patent: May 31, 2005

(54) FORMAT CONVERTER USING BI-DIRECTIONAL MOTION VECTOR AND METHOD THEREOF

(75) Inventors: Sung-hee Lee, Suwon (KR); Sung-Jea Ko, Seoul (KR)

(73) Assignee: Samsung Electronics Co., Ltd. (KR)

( * ) Notice: Subject to any disclaimer, the term of this patent is extended or adjusted under 35 U.S.C. 154(b) by 688 days.

(21) Appl. No.: 09/878,916

(22) Filed: Jun. 13, 2001

(65) Prior Publication Data

US 2002/0036705 A1 Mar. 28, 2002

(30) Foreign Application Priority Data

Jun. 13, 2000 (KR) .......................................... 2000-32388

(51) Int. Cl.⁷ ................................................. H04N 7/01
(52) U.S. Cl. ....................... 348/459; 348/448; 348/441; 348/452; 348/451; 382/236; 375/240.15
(58) Field of Search ................................. 348/459, 448, 348/441, 447, 452, 451, 699, 700, 701, 910; 382/236, 252; 375/240.15, 240.16, 240.27

(56) References Cited

U.S. PATENT DOCUMENTS

| 4,691,230 A | | 9/1987 | Kaneko et al. | |
| 5,198,901 A | * | 3/1993 | Lynch .................... | 375/240.14 |
| 5,453,799 A | * | 9/1995 | Yang et al. ................. | 348/699 |
| 5,526,053 A | | 6/1996 | Dorricott et al. | |
| 5,619,272 A | * | 4/1997 | Salmon et al. .............. | 348/452 |
| 5,642,166 A | * | 6/1997 | Shin et al. ............. | 375/240.15 |
| 5,661,524 A | * | 8/1997 | Murdock et al. ...... | 375/240.15 |
| 5,661,525 A | * | 8/1997 | Kovacevic et al. .......... | 348/452 |
| 5,699,128 A | * | 12/1997 | Hayashi ....................... | 348/699 |
| 5,751,365 A | * | 5/1998 | Yokoyama ............... | 348/416.1 |
| 5,778,097 A | * | 7/1998 | Nickerson .................... | 382/236 |
| 5,784,115 A | * | 7/1998 | Bozdagi ..................... | 348/452 |
| 5,786,860 A | * | 7/1998 | Kim et al. ............. | 375/240.15 |
| 5,796,437 A | | 8/1998 | Muraji et al. | |
| 5,886,742 A | * | 3/1999 | Hibi et al. ............. | 375/240.16 |
| 6,122,319 A | * | 9/2000 | Lee et al. .............. | 375/240.16 |
| 6,125,143 A | * | 9/2000 | Suzuki et al. .......... | 375/240.11 |
| 6,192,079 B1 | * | 2/2001 | Sharma et al. ......... | 375/240.16 |
| 6,404,813 B1 | * | 6/2002 | Haskell et al. ......... | 375/240.12 |
| 6,535,244 B1 | * | 3/2003 | Lee et al. ................ | 348/208.1 |

FOREIGN PATENT DOCUMENTS

| CN | 1131869 A | 9/1996 |
| CN | 1139860 A | 1/1997 |
| WO | WO 94/16522 | 7/1994 |
| WO | WO 99/67952 | 12/1999 |
| WO | WO 00/38423 | 6/2000 |

* cited by examiner

*Primary Examiner*—John Miller
*Assistant Examiner*—Jean W. Désir
(74) *Attorney, Agent, or Firm*—Sughrue Mion, PLLC

(57) ABSTRACT

A format converter which performs frame rate conversion and de-interlacing using a bi-directional motion vector and a method thereof are provided. The method includes the steps of (a) estimating a bi-directional motion vector between the current frame and the previous frame from a frame to be interpolated; setting the motion vector of a neighboring block that has the minimum error distortion, among motion vectors estimated in step (a), as the motion vector of the current block; and (c) forming a frame to be interpolated with the motion vector set in step (b).

20 Claims, 10 Drawing Sheets

MOTION FIELD
BEFORE REFINEMENT

MOTION FIELD
AFTER REFINEMENT

MV : MOTION VECTOR

FORMAT CONVERTER USING BI-DIRECTIONAL MOTION VECTOR AND METHOD THEREOF

BACKGROUND OF THE INVENTION

1. Field of the Invention

The present invention generally relates to an image signal format converter and an associated method of performing the conversion. More particularly, the invention relates to a format converter, and method, that performs frame rate conversion and de-interlacing using a bi-directional motion vector. The present application is based on Korean Patent Application No. 00-32388 filed on Jun. 13, 2000, which is incorporated herein by reference.

2. Description of the Related Art

Generally, in a PC or a high definition TV (HDTV), conversion of a format such as a frame rate and/or de-interlacing is needed to exchange signals utilizing various signal standards.

Figure 1:
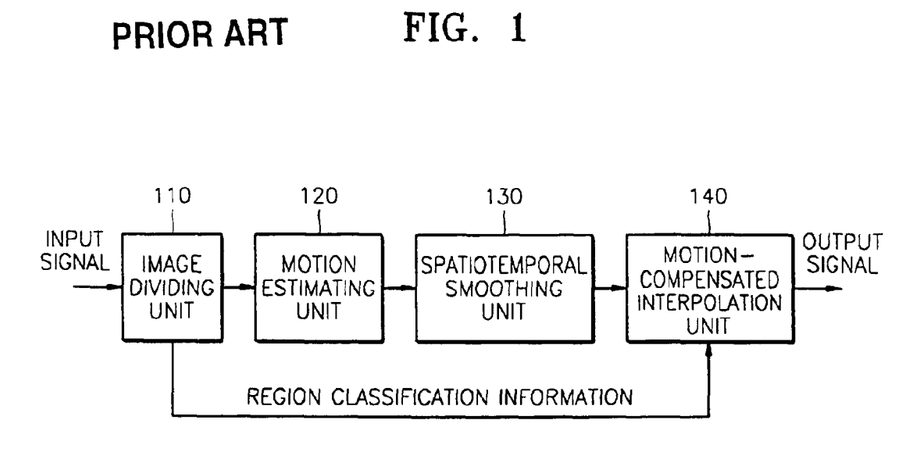
FIG. 1 is a block diagram of a conventional frame rate conversion apparatus.

FIG. 1 is a block diagram of a conventional frame rate conversion apparatus.

Figure 2:
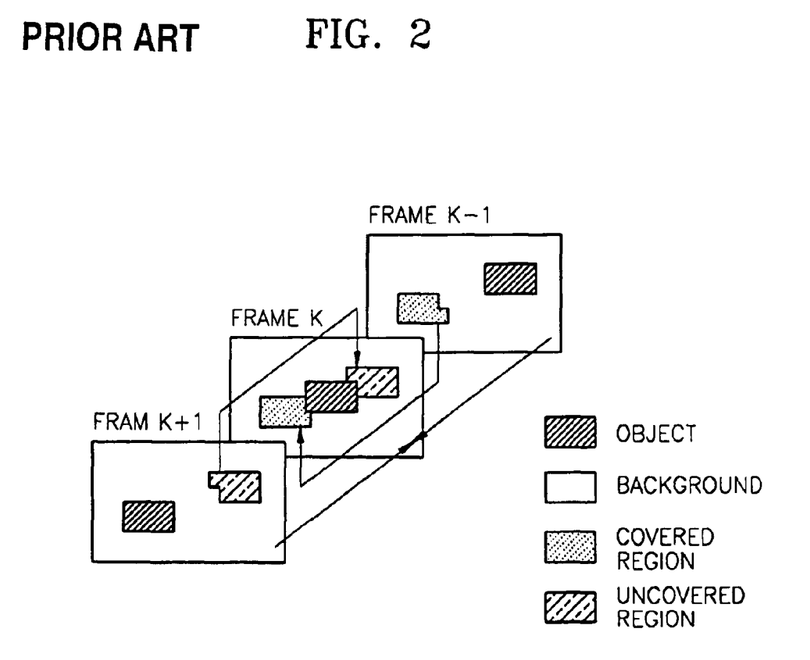
FIG. 2 is a diagram for explaining an image dividing method in the image dividing unit of FIG. 1.

Referring to FIG. 1, an image dividing unit 110 divides an image into a changed region and an unchanged region for efficient motion estimation as shown in FIG. 2. The unchanged region is divided again into a covered region, an uncovered region, a background, and an object.

Figure 3:
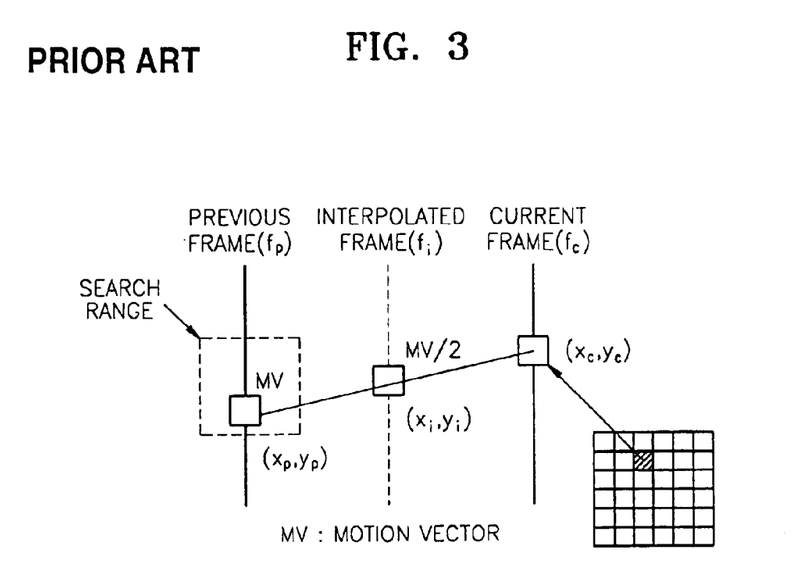
FIG. 3 is a diagram for explaining a motion estimating method in the motion estimating unit of FIG. 1.

A motion estimating unit 120 generates the motion vector of a block using a block matching algorithm which is generally known in the art of video coding. In a representative conventional block matching algorithm, a motion vector is determined for each block based on the assumption that pixels in a predetermined-size block, as shown in FIG. 3, moved without rotation, magnification, or reduction. In FIG. 3, it is assumed that the motion vector of an N×N size base block located on arbitrary coordinates $(x_c, y_c)$ in the current frame $(f_c)$ is estimated in a range of ±P pixels from the previous frame $(f_p)$. Then, the search range in the previous frame is $(N+2P) \times (N+2P)$. Therefore, the motion vector is determined at a location which has the maximum correlation among the total $(2P+1)^2$ candidate locations.

At this time, the difference between the base block in the current frame and the candidate block in the previous frame is calculated as a mean absolute difference (MAD) by the following equation 1:

$$MAD = \frac{1}{N^2} \sum_{i=1}^{N} \sum_{j=1}^{N} |f_c(x_c+i, y_c+j) - f_p(x_c+i+m, y_c+j+n)| \quad (1)$$

Here, the motion vector of the final block is determined at a location (m, n) of a search range for which the mean absolute difference between the current block and the candidate block is a minimum.

Figure 4:
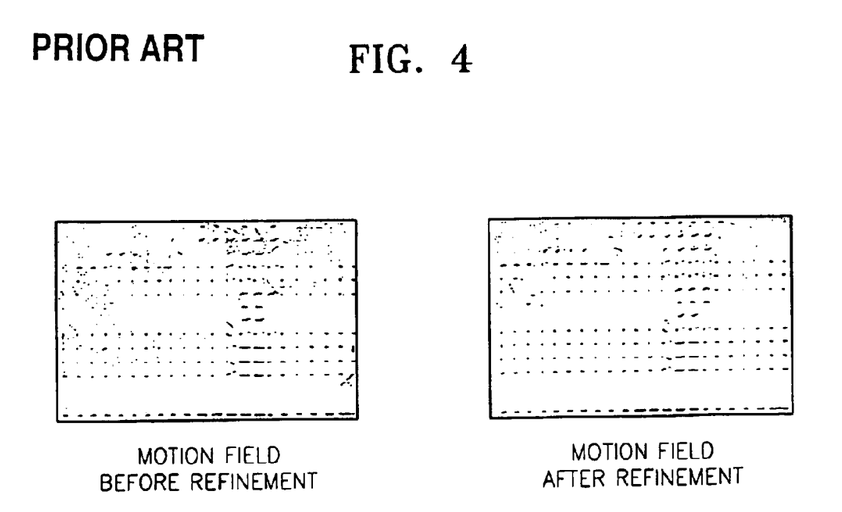
FIG. 4 illustrates a screen before refinement and a screen after refinement in the spatiotemporal smoothing unit of FIG. 1.

A spatiotemporal smoothing unit 130 refines an inappropriate motion vector obtained in the motion estimating unit 120, and refines the smoothness of a motion vector as shown in FIG. 4.

Figure 5:
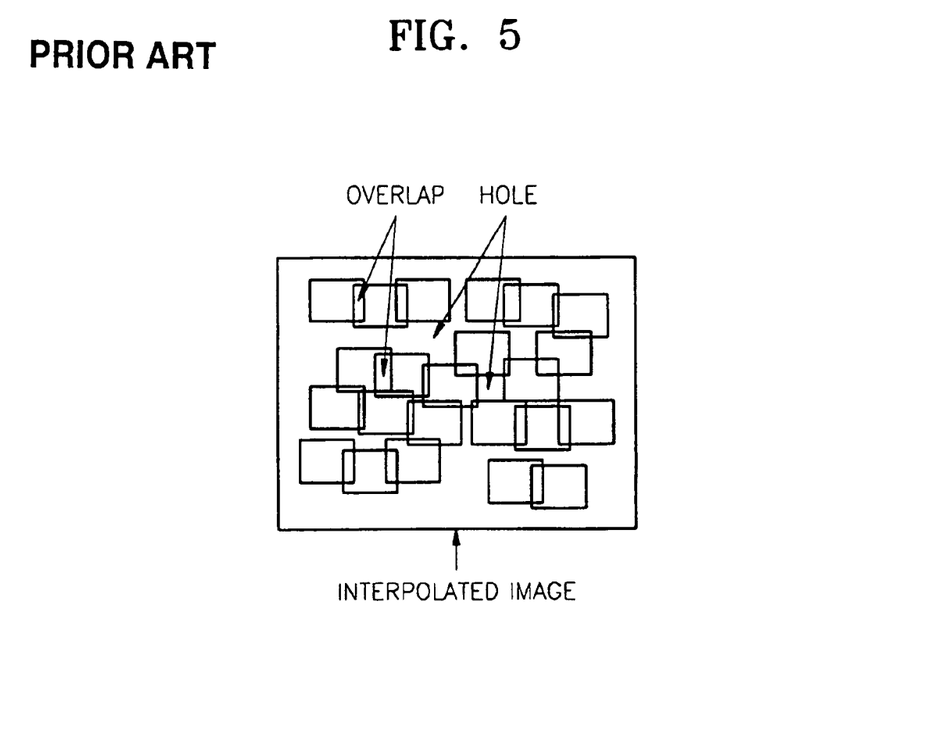
FIG. 5 is an example of the structure of an image interpolated by motion compensation in the motion-compensated interpolation unit of FIG. 1.

A motion-compensated interpolation unit 140 finds a forward motion vector for the previous frame and the next frame of an image to be interpolated and, using the obtained motion vector, performs bi-directional interpolation according to region classification information generated in the image dividing unit 110. At this time, as shown in FIG. 5, the motion-compensated interpolation using a forward motion vector generates overlaps, where blocks are overlapped because two or more motion vectors are assigned in a frame to be interpolated, and holes where a motion vector is not assigned. These overlaps and holes directly affect the picture quality of an image by causing a degradation in the picture quality. Also, since these overlaps and holes have irregular shapes, they should be handled on a pixel-by-pixel basis. Therefore, for the conventional apparatus, complicated signal processing processes and complicated hardware are necessary to remove the overlaps and holes.

Also, for an ordinary television video signal, a frequency band is compressed using an interlacing method in which two fields form a frame. Recently, in a PC or an HDTV, for which the displays generally use a progressive scanning method to display an interlaced image, empty image lines, due to de-interlacing, are generated by an arbitrary method for progressive scanning.

Figure 6:
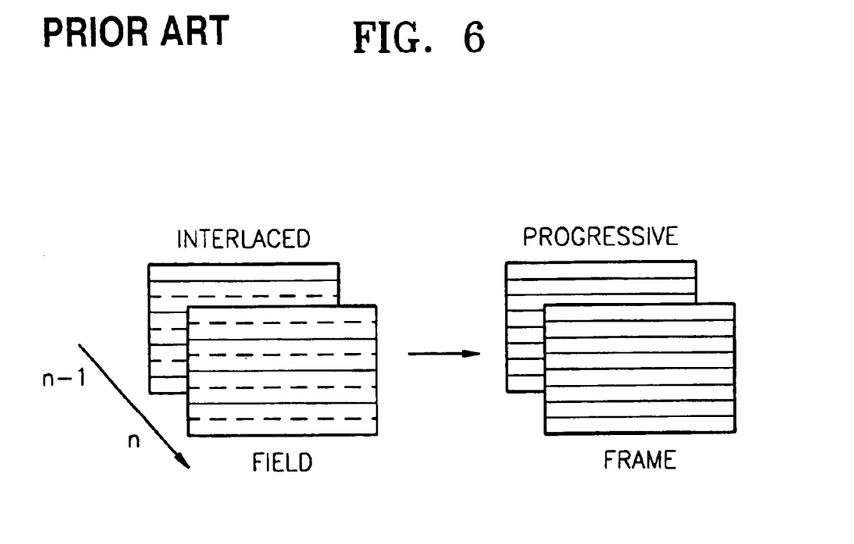
FIG. 6 is a conceptual basic diagram of ordinary de-interlacing.

FIG. 6 is a conceptual basic diagram of ordinary de-interlacing.

Referring to FIG. 6, de-interlacing changes a field containing only an odd-numbered pixel, or only an even-numbered pixel, into a frame. At this time, an output frame $F_0(\vec{x}, n)$ is defined by the following equation 2:

$$F_0(\vec{x}, n) = \begin{cases} F(\vec{x}, n), & (y \bmod 2 = n \bmod 2) \\ F_i(\vec{x}, n), & \text{otherwise} \end{cases} \quad (2)$$

Here, $\vec{x}$ means a spatial location, and n is a field number. $F(\vec{x}, n)$ is an input field, and $F_i(\vec{x}, n)$ is a pixel to be interpolated.

Figure 7:
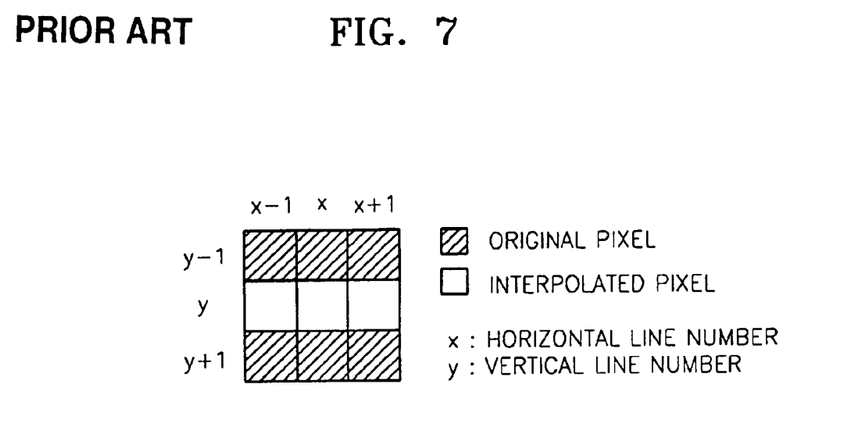
FIG. 7 is a 3×3 window for applying edge-based line averaging (ELA) de-interlacing algorithm which does not use motion compensation.

FIG. 7 is a 3×3 window for applying an edge-based line averaging (ELA) de-interlacing algorithm which does not use motion compensation.

Figure 8:
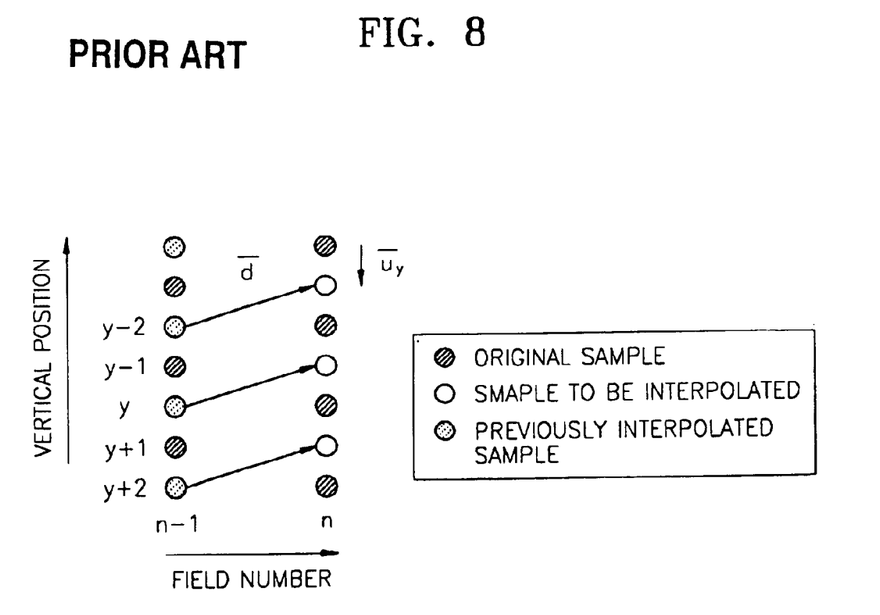
FIG. 8 is a diagram for explaining motion vector estimation for each block in the spatiotemporal smoothing unit of FIG. 6.

Referring to FIG. 7, ELA de-interlacing uses the correlation between pixels considering direction (x, y) from the location of a pixel to be interpolated as shown in equation 3, below. That is, the mean value of pixels neighboring a pixel to be interpolated and pixels to be interpolated in the previous field and the next field of the field to be interpolated is output, as follows:

$$F_0(\vec{x}, n) = \quad (3)$$

$$\begin{cases} F(\vec{x} - \vec{u}_x - \vec{u}_y, n) + F(\vec{x} + \vec{u}_x + \vec{u}_y, n)/2, & \text{if } \min(a, b, c) = a \\ F(\vec{x} - \vec{u}_x + \vec{u}_y, n) + F(\vec{x} + \vec{u}_x - \vec{u}_y, n)/2, & \text{if } \min(a, b, c) = b \\ F(\vec{x} - \vec{u}_y, n) + F(\vec{x} + \vec{u}_y, n)/2, & \text{otherwise} \end{cases}$$

here, $a = |F(\vec{x} - \vec{u}_x - \vec{u}_y, n) - F(\vec{x} + \vec{u}_x + \vec{u}_y, n)|$ $b = |F(\vec{x} - \vec{u}_x + \vec{u}_y, n) - F(\vec{x} + \vec{u}_x - \vec{u}_y, n)|$ $c = |F(\vec{x} - \vec{u}_y, n) - F(\vec{x} + \vec{u}_y, n)|$ FIG. 8 is a conceptual diagram for explaining an ordinary time-recursive (TR) de-interlacing method.

Referring to FIG. 8, TR de-interlacing using a motion vector assumes that the previous field (n−1) is perfectly de-interlaced, and the missing data of the current field (n) is compensated with a motion vector. A pixel to be interpolated can be the original pixel of the previous field, or a previously interpolated pixel. Therefore, a pixel to be interpolated can be expressed as the following equation 4:

$$F_0(\vec{x}, n) = \begin{cases} F(\vec{x}, n), & (y \bmod 2 = n \bmod 2), \\ F(\vec{x} - d(\vec{x}, n), n - 1), & \text{otherwise} \end{cases} \quad (4)$$

However, since the ELA de-interlacing method does not use motion compensation, flickering occurs in regions where movement exists and, since the TR de-interlacing method is continuously de-interlaced, an error that occurs in an arbitrary field can be propagated to other fields.

SUMMARY OF THE INVENTION

To solve the above problems, it is an object of the present invention to provide a frame rate converting method which refines a picture quality by directly obtaining a bi-directional motion vector of two continuous frames for a pixel to be interpolated.

It is another object to provide a frame rate converter using the frame rate converting method.

It is another object to provide a de-interlacing method wherein by estimating a bi-directional motion vector between two continuous fields for a pixel to be interpolated, the method is easy to perform and has an excellent outline-keeping ability.

It is another object to provide a de-interlacing apparatus using the de-interlacing method.

It is another object to provide a de-interlacing apparatus which can enhance reliability of motion information and reduce errors in a pixel to be interpolated by adaptively selecting between motion-compensated interpolation value and spatiotemporal interpolation value according to the degree of motion in an input image.

To accomplish the above-mentioned objects of the present invention, there is provided a frame rate converting method having the steps of (a) estimating a bi-directional motion vector for a frame to be interpolated using motion vectors between the current frame and the previous frame; (b) setting the motion vector of a neighboring block, having the minimum error distortion among motion vectors estimated in step (a), in a frame to be interpolated, as the motion vector of the current block; and (c) forming a frame to be interpolated with the motion vector set in step (b).

To accomplish another object of the present invention, there is also provided a frame rate converter having a bi-directional motion estimating means for obtaining the motion vector between the current frame and the previous frame, assigning the motion vector to a frame to be interpolated, and estimating the assigned motion vector for a frame to be interpolated; a spatiotemporal smoothing unit for evaluating the accuracy of the motion vector of the current block in the frame to be interpolated in the bi-directional motion estimating means, and then setting the motion vector of a neighboring block, which has the minimum error distortion, as the motion vector of the current block; and an interpolation unit for extending the block to be interpolated, and interpolating with the motion vector obtained in the spatiotemporal smoothing unit in an overlapped region with different weights.

To accomplish another object of the present invention, there is also provided a de-interlacing method including (a) estimating a bi-directional motion vector for a pixel to be interpolated using motion vectors between the previous field and the next field; (b) setting the motion vector for which neighboring error distortion is the minimum in step (a) as the motion vector of a pixel to be interpolated; and (c) forming the pixel to be interpolated with the motion vector set in step (b).

To accomplish another object of the present invention, there is also provided a de-interlacing apparatus having a bi-directional motion estimating means for obtaining the motion vector between the current field and the previous field, assigning the motion vector to a field to be interpolated, and estimating the assigned motion vector for a field to be interpolated; a spatiotemporal smoothing unit for evaluating the accuracy of the motion vector of the current block in the field to be interpolated in the bi-directional motion estimating means, and then setting the motion vector of a neighboring block, which has the minimum error distortion, as the motion vector of the current block; and a signal converting unit for forming a pixel of a line having no data, with the median value of pixel values obtained by applying the motion vector set in the spatiotemporal smoothing unit, the mean value of the pixel values, and the values of pixels vertically neighboring the pixel to be interpolated.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Hereinafter, embodiments of the present invention will be described in detail with reference to the attached drawings. The present invention is not restricted to the following embodiments, and many variations are possible within the spirit and scope of the present invention. The embodiments of the present invention are provided in order to more completely explain the present invention to anyone skilled in the art.

Figure 9:
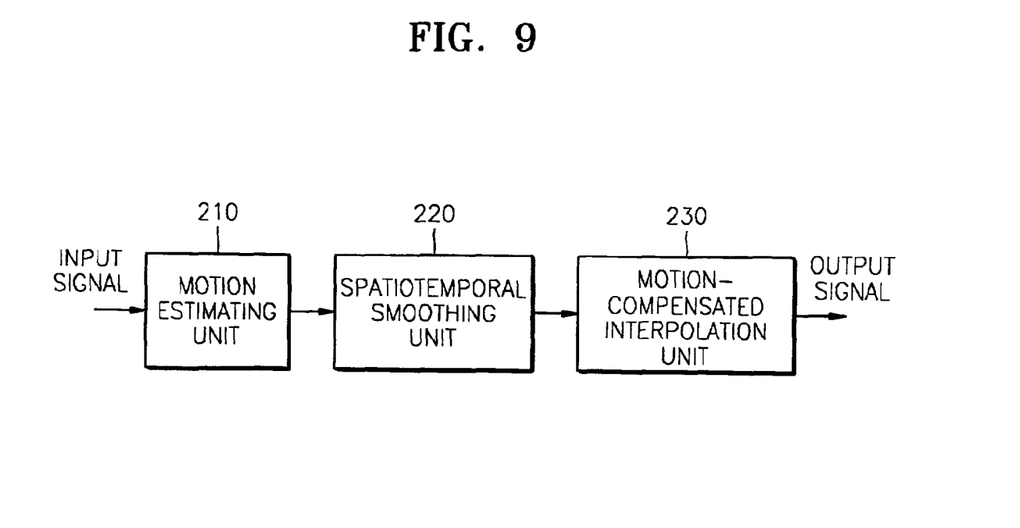
FIG. 9 is a block diagram of a frame rate conversion apparatus according to the present invention.

FIG. 9 is a block diagram of a frame rate conversion apparatus according to the present invention The apparatus of FIG. 9 includes a motion estimating unit 210, a spatiotemporal smoothing unit 220, and a refined motion-compensated interpolation unit 230.

Referring to FIG. 9, the motion estimating unit 210 obtains a motion vector between the current frame and the previous frame, and assigns the motion vector to a frame to be interpolated, and estimates a bi-directional motion vector for the frame to be interpolated.

The spatiotemporal smoothing unit 220 evaluates the accuracy of the motion vector of the current block estimated for the frame to be interpolated, and then sets a motion vector of neighboring blocks, for which error distortion is the minimum, as the motion vector of the current block.

The refined motion-compensated interpolation unit 230 forms a block to be interpolated with the mean of blocks in the previous frame and the next frame of the frame to be interpolated, using the motion vector obtained in the spatiotemporal smoothing unit 220. At this time, the refined motion-compensation interpolation unit 230 extends the block to be interpolated and interpolates with different weights in an overlap region.

Figure 10A:
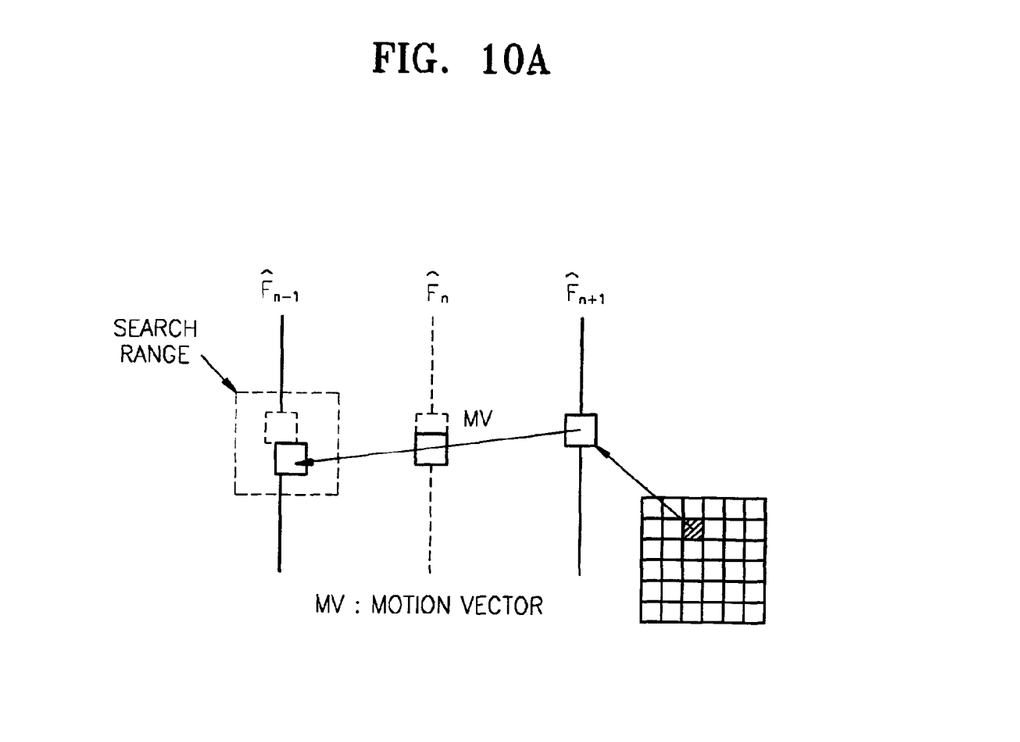
FIGS. 10A through 10C are conceptual diagrams for obtaining a bi-directional motion vector.
Figure 10B:
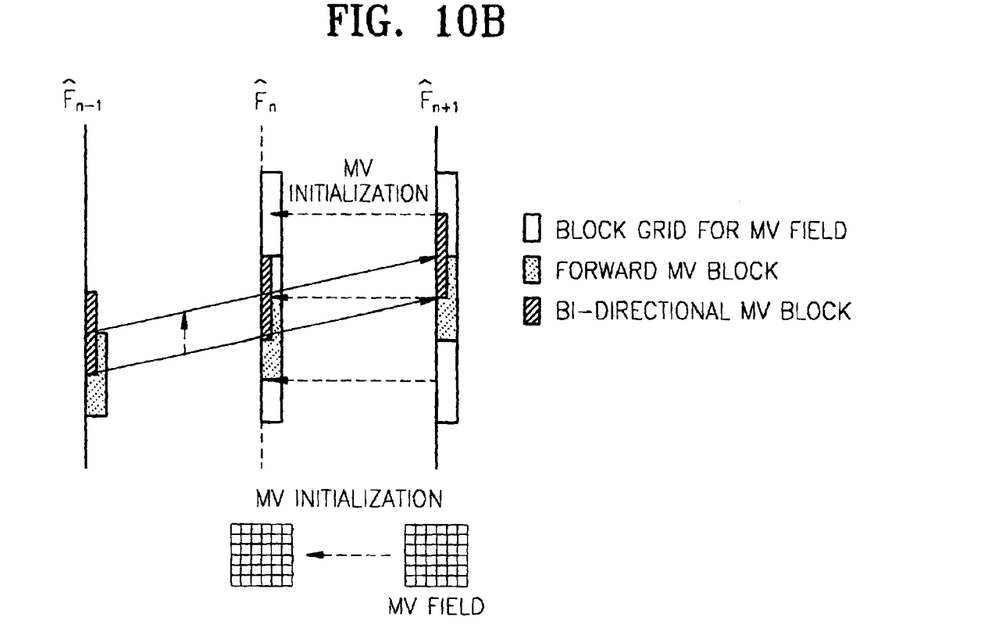
Figure 10C:
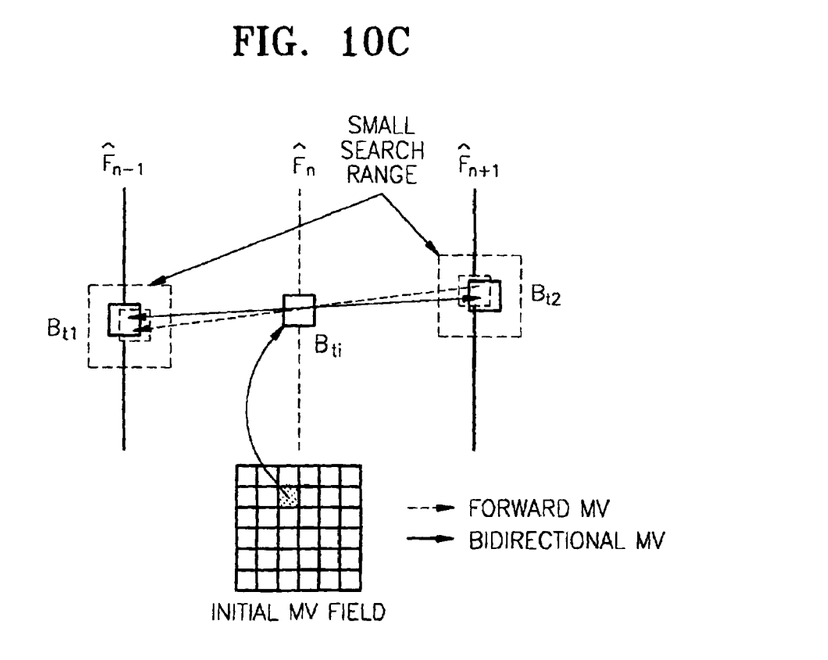

FIGS. 10A through 10C are conceptual diagrams for obtaining a bi-directional motion vector.

First, in neighboring frames, $F_{n-1}$ is the (n−1)-th frame, $F_{n+1}$ is the (n+1)-th frame, and $F_n$ is the n-th frame. In the n-th frame ($F_n$), as shown in FIGS. 10A through 10C, a bi-directional motion vector is obtained through a motion vector initialization stage (FIGS. 10A and 10B) and a motion vector adjusting stage (FIG. 10C).

Referring to FIG. 10A, the motion vector initialization stage will now be explained.

First, (n−1)-th frame/field ($F_{n-1}$) and (n+1)-th frame/field ($F_{n+1}$) are decimated in 2:1 ratio, and reconstructed to (n−1)-th frame/field ($\hat{F}_{n-1}$) and (n+1)-th frame/field ($\hat{F}_{n+1}$).

Then, as shown in FIG. 10A, the (n+1)-th frame/field ($\hat{F}_{n+1}$) is divided into a plurality of blocks, and a search range in ($\hat{F}_{n-1}$) for each block is determined. Then, within the search range, by applying a block matching algorithm (BMA) to ($\hat{F}_{n-1}$) and ($\hat{F}_{n+1}$), a forward motion vector (MV) is estimated for each block. Then, as shown in FIG. 10B, the n-th frame/field ($\hat{F}_n$) to be interpolated is also divided into blocks, and the estimated forward MV for each block is set as an initial MV for each block of the n-th frame/field ($\hat{F}_n$) to be interpolated.

Then, by compensating for motion according to the block grid for each block using a bi-directional motion vector as shown in FIG. 10B, overlaps and holes do not occur in the existing video signal. That is, as shown in FIG. 10B, the forward motion vector is initialized (by simply moving the motion vector into a block) to match with the block grid of the n-th frame/field ($\hat{F}_n$) to be interpolated. Accordingly, overlaps and holes are not generated similar to the way they are generated when a forward motion vector is estimated based on the (n−1)-th frame/field ($\hat{F}_{n-1}$). This is because the block grid and the interpolated blocks are matched.

Next, referring to FIG. 10C, the motion vector adjusting stage will now be explained. First, since the forward MV is used in the initialization stage, without the benefit of a bi-directional motion vector, the initial MV, for the field to be interpolated, is not precise. To account for this imprecision, taking the forward MV obtained in the motion vector initialization stage as an initial value, a small search range (±d) is newly set in ($\hat{F}_{n-1}$) and ($\hat{F}_{n+1}$). Then, using a BMA again in the small search range (±d), matching blocks in frame/field ($\hat{F}_n$) to blocks in frames/fields ($\hat{F}_{n-1}$) and ($\hat{F}_{n+1}$), the motion vector set in the initial stage is corrected, and a bi-directional motion vector is generated.

To explain the adjusting stage for the initial MV shown in FIG. 10C, an arbitrary block ($B_{ti}$) in the n-th frame/field ($\hat{F}_n$) to be interpolated is considered. The center of the block ($B_{ti}$) is located at coordinates (x,y), and corresponds to the initial MV ($\vec{D}_i$)=(h, v)). At this time, the initial MV ($\vec{D}_i$) simultaneously shows the motion between the n-th frame/field ($\hat{F}_n$) to be interpolated for the arbitrary block ($B_{ti}$) and the (n+1)-th frame/field ($\hat{F}_{n+1}$) as well as the motion from the (n−1)-th frame/field ($\hat{F}_{n-1}$) to the n-th frame/field ($\hat{F}_n$) to be interpolated. Then, if the arbitrary block ($B_{ti}$) in the n-th frame/field ($\hat{F}_n$) to be interpolated were to move in accordance with the initial MV ($\vec{D}_i$), the arbitrary block ($B_{ti}$) would be generated by the block ($B_{t1}$) of the (n−1)-th frame/field ($\hat{F}_{n-1}$) and the block ($B_{t2}$) of the (n+1)-th frame/field ($\hat{F}_{n+1}$). That is, the centers of the initial block ($B_{t1}$) and block ($B_{t2}$) can be expressed by the following equation 5:

$$B_{t1}(x_{t1}, y_{t1}) = (x, y) - (h, v) = (x-h, y-v)$$

$$B_{t2}(x_{t2}, y_{t2}) = (x, y) + (h, v) = (x+h, y+v)$$

Here, the arbitrary block ($B_{ti}$) is located on a fixed location, and each of block ($B_{t1}$) and block ($B_{t2}$) moves from the initial location within the search range (±d). At this time, if the n-th frame/field ($\hat{F}_n$) should be located in the center between the (n−1)-th frame/field ($\hat{F}_{n-1}$) and the (n+1)-th frame/field ($\hat{F}_{n+1}$), the motion between the block ($B_{t1}$) and the arbitrary block ($B_{ti}$) should be the same as the motion between the arbitrary block ($B_{ti}$) and the block ($B_{t2}$). For this, on the motion trajectory of the initial MV, the block ($B_{t1}$) and the block ($B_{t2}$) should move symmetrically from the center of the block ($B_{ti}$) to be interpolated.

Therefore, the number of possible combinations when the search range is ±d is $(2d+1)^2$. Subsequently, the bi-directional vector between the (n−1)-th frame/field ($\hat{F}_{n-1}$) and the (n+1)-th frame/field ($\hat{F}_{n+1}$) for the n-th frame/field ($\hat{F}_n$) is obtained. At this time, if the n-th frame/field ($\hat{F}_n$) should be at the center between the (n−1)-th frame/field ($\hat{F}_{n-1}$) and the (n+1)-th frame/field ($\hat{F}_{n+1}$) the motion vector to each direction would have the same value.

Figure 11:
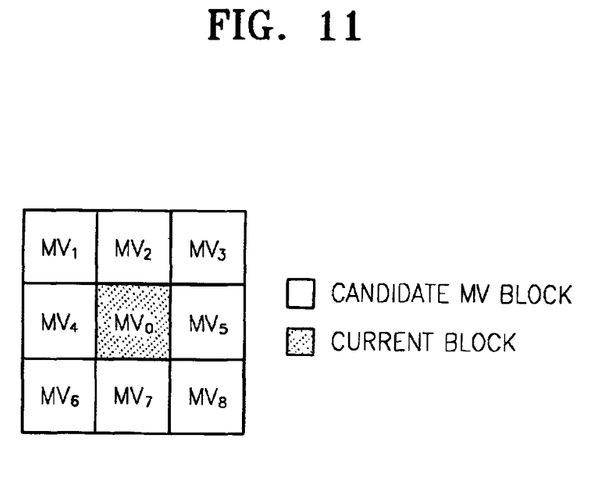
FIG. 11 is a conceptual diagram for refining a motion vector of the spatiotemporal smoothing unit of FIG. 9.

FIG. 11 is a conceptual diagram for refining a motion vector of the spatiotemporal smoothing unit 220 of FIG. 9.

Referring to FIG. 11, first, in the frame/field to be interpolated, the current block under consideration is designated, $MV_0$, candidate MV blocks surrounding the current block are designated $MV_i$ (i=1, . . . ,8), and the motion vector of the current block is designated D. Then, the motion vector of a block having the minimum displaced frame difference (DFD) among the motion vectors of the candidate blocks surrounding the current block is set as the motion vector of the current block. That is, in accordance with equation 6 below, using the bi-directional motion vector between two neighboring frame/fields, the DFD of the current block is obtained and the motion vector of the candidate block having the minimum DFD is set as the motion vector of the current block. As a result, the spatiotemporal smoothing process refines picture quality by removing inaccurate motion vectors detected in the motion estimation.

$$DFD(D) = \sum_{p \in B(p)} |f_{t1}(p - D) - f_{t2}(p + D)| \qquad (6)$$

In equation 6, B(p) represents the interpolated block, p represents the position of a pixel within a block, and D represents the motion vector of a block.

Figure 12:
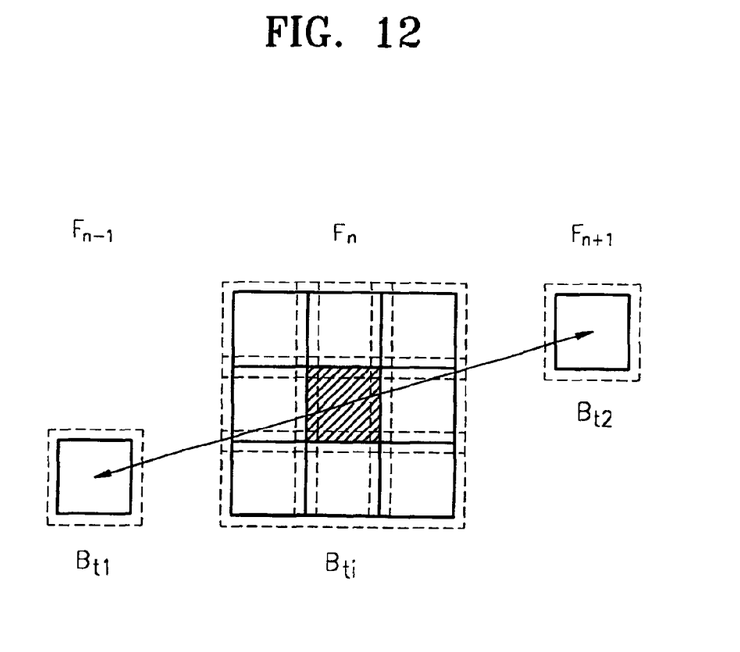
FIG. 12 is a conceptual diagram for explaining a motion-compensated interpolation method of the refined motion-compensated interpolation unit of FIG. 9.

FIG. 12 is a conceptual diagram for explaining a motion-compensated interpolation method of the refined motion-compensated interpolation unit 230 of FIG. 9

Referring to FIG. 12, the refined motion-compensated interpolation unit 230 forms a frame to be interpolated after taking the block mean of the two neighboring frames according to equation 7, below, using the motion vector obtained bi-directionally. At this time, the frame to be interpolated extends the original block size horizontally and vertically, and is interpolated in the overlapped region with different weights.

$$f_{ti}(p) = \frac{1}{2}[f_{t1}(p - D(B(p))) - f_{t2}(p - D(B(p)))] \qquad (7)$$

Figure 13:
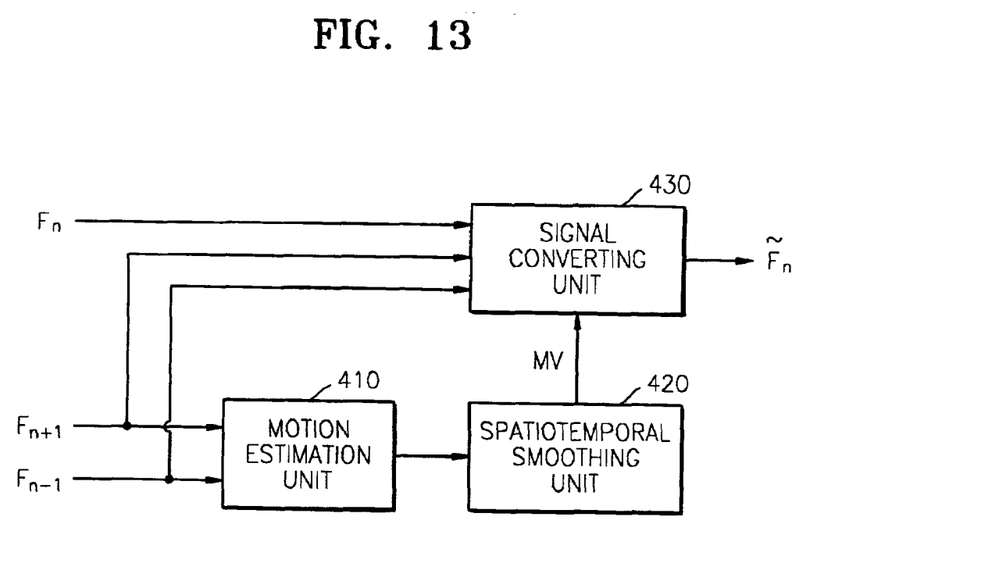
FIG. 13 is a block diagram of a de-interlacing apparatus according to the present invention.

FIG. 13 is a block diagram of a de-interlacing apparatus according to the present invention.

Referring to FIG. 13, $F_{-1}$, which is input first, is the (n−1)-th field, $F_n$ is n-th field, and $F_{n+1}$ is (n+1)-th field. $\tilde{F}_n$ is a video signal which is converted from the n-th field ($F_n$) for progressive scanning.

A motion estimating unit 410 obtains the motion vector of the n-th field ($F_n$), which corresponds to the location of the field to be interpolated, after obtaining the bi-directional motion vector, from the (n−1)-th field ($F_{n-1}$) and the (n+1)-th field ($F_{n+1}$). The bi-directional motion vector to be obtained in the n-th field ($F_n$) is obtained by calculating the fields, for which decimation conversion has been performed, through the motion vector initialization stage (FIGS. 10A and 10B) and the motion vector adjusting stage (FIG. 10C). As a result, for the field to be interpolated, the bi-directional motion vector between the previous field and the next field is calculated.

A spatiotemporal smoothing unit 420, as illustrated in FIG. 11, obtains a bi-directional motion vector, which is smoothed through spatiotemporal smoothing, because bi-directional motion vectors obtained in the motion estimating unit 410 have some discontinuities.

A signal converting unit 430, which is an interlaced-to-progressive conversion block, restores any "no-data" lines in the n-th field ($F_n$) with the mean of pixels to which bi-directional motion vectors generated in the spatiotemporal smoothing unit 420 are applied, and outputs the final frame $\tilde{F}_n$.

Figure 14:
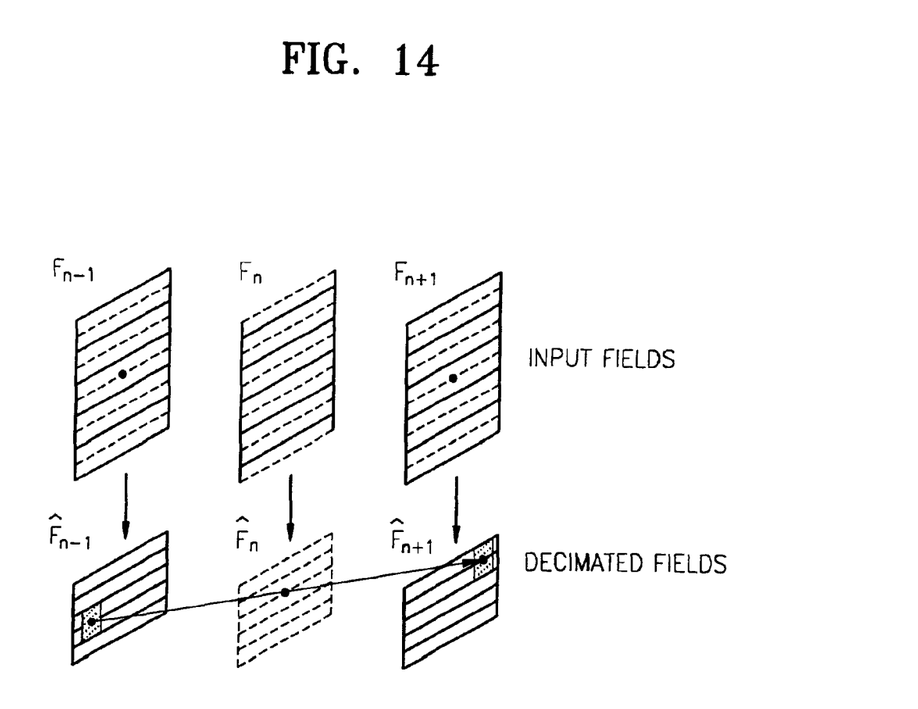
FIG. 14 is a conceptual diagram for showing decimation conversion of the motion estimating unit of FIG. 13.

FIG. 14 is a conceptual diagram for showing decimation conversion of the motion estimating unit 410 of FIG. 13.

Referring to FIG. 14, the (n−1)-th field ($F_{n-1}$) and the (n+1)-th field ($F_{n+1}$) are input and reconstructed to the (n−1)-th field $\hat{F}_{n-1}$ and the (n+1)-th field $\hat{F}_{n+1}$, only with the lines having data. That is, the reconstructed (n−1)-th field $\hat{F}_{n-1}$ and (n+1)-th field $\hat{F}_{n+1}$ are reduced from the input (n−1)-th field ($F_{n-1}$) and (n+1)-th field ($F_{n+1}$) by half, vertically. Therefore, the reconstructed (n−1)-th field $\hat{F}_{n-1}$ and (n+1)-th field $\hat{F}_{n+1}$ are decimated in a 2:1 ratio vertically and horizontally.

Figure 15:
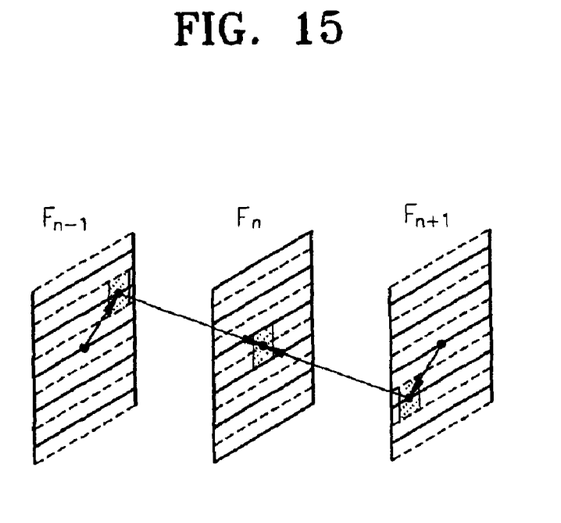
FIG. 15 is a conceptual diagram for showing motion-compensated de-interlacing in the signal conversion unit of FIG. 13.

FIG. 15 is a conceptual diagram for showing motion-compensated de-interlacing in the signal conversion unit 430 of FIG. 13.

Referring to FIG. 15, "no-data" lines of the n-th field ($F_n$) are restored, using the bi-directional motion vector of the field ($\hat{F}_n$) to be interpolated. The restoration process can be expressed by the following equation 8:

$$\tilde{F}_n = \frac{F_{n-1}(x - h, y - v) + F_{n+1}(x + h, y + v)}{2} \qquad (8)$$

Here, x and y are the abscissa value and the ordinate value, respectively, in each field, and h and v are the horizontal component and the vertical component, respectively, of the bi-directional motion vector.

Figure 16:
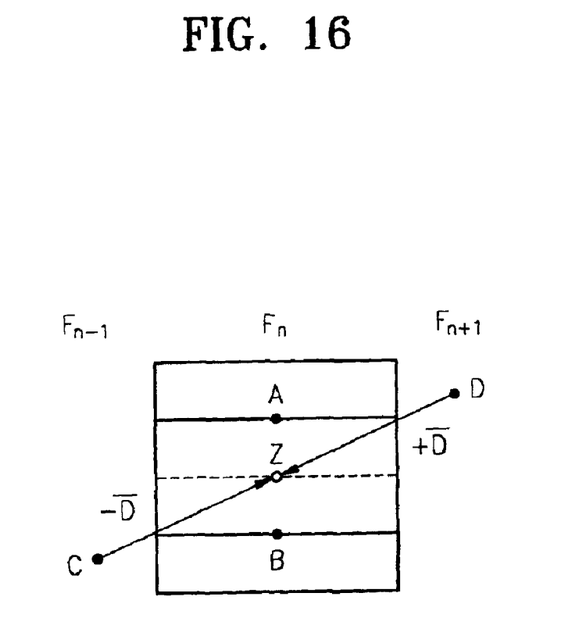
FIG. 16 is a conceptual diagram for showing spatiotemporal interpolation using a median filter in the signal conversion unit of FIG. 13.

FIG. 16 is a conceptual diagram for showing spatiotemporal interpolation using a median filter in the signal conversion unit of FIG. 13.

The performance of a de-interlacing method is affected greatly by the result of motion estimation. Therefore, to reduce any error in motion estimation, "no data" lines in the field $\hat{F}_n$ to be interpolated are interpolated using a median filter as shown in FIG. 16. This interpolation can be expressed by the following equation 9:

$$\tilde{F}_n(\vec{p}) = \qquad (9)$$

$$\begin{cases} F_n(\vec{p}), & \text{if } \vec{p} \text{ is in the existing line,} \\ \text{Median}\left(A, B, C, D, \frac{(C+D)}{2}\right), & \text{otherwise} \end{cases}$$

Here, pixels A, B, C, and D are defined as follows:

$$A = F_n(\vec{p} - \vec{u}_y), \ B = F_n(\vec{p} + \vec{u}_y), \ C = F_{n-1}(\vec{p} - \vec{D}), \ D = F_{n+1}(\vec{p} + \vec{D})$$

Here, $\vec{D}$ is a bi-directional motion vector, $\vec{u}_y$ is $(0, 1)^T$, and (C+D)/2 is the resulting value of the motion-compensated de-interlacing according to equation 9.

Accordingly, if the median filter is used, the frame ($\hat{F}_n$) to be finally output takes the value of the original pixel if the line has data, and otherwise is interpolated with the median value of the pixel (C) of the (n−1)-th field, the pixel (D) of the (n+1)-th field, pixels (A, B) which are vertically neighboring the pixel (Z) to be interpolated in the n-th field, and de-interlaced pixel ((C+D)/2), as the pixel (Z) of the n-th field.

Figure 17:
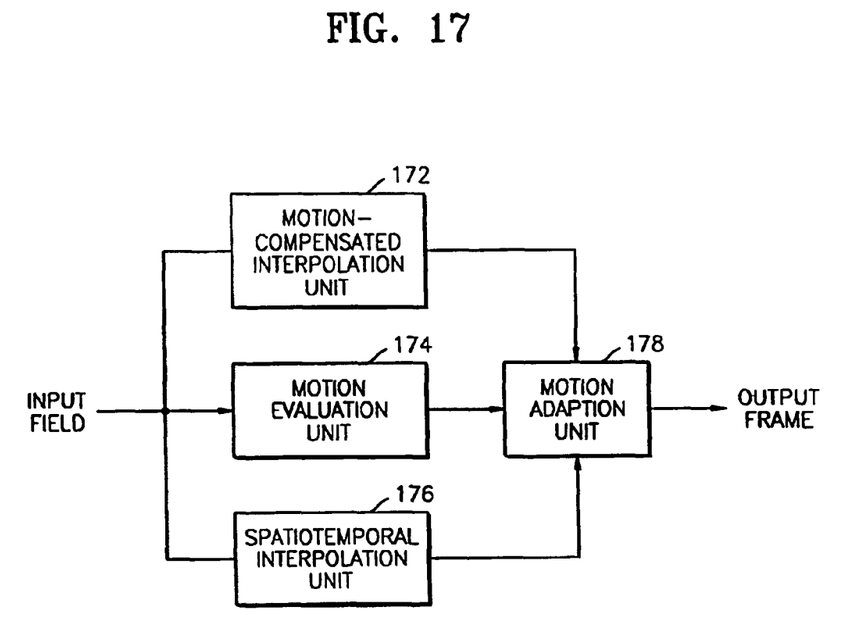
FIG. 17 is another embodiment of a de-interlacing apparatus according to the present invention.

FIG. 17 is another embodiment of a de-interlacing apparatus according to the present invention.

Referring to FIG. 17, a motion-compensated interpolation unit 172 interpolates with the mean of pixels using the interpolation value of a frame, that is a motion vector, as shown in FIG. 13 according to the present invention, or outputs the median value of pixel values, to which a motion vector is applied, the mean value of the pixels, and the value between two pixels which are vertically neighboring a pixel to be interpolated.

A spatiotemporal interpolation unit 176 outputs the mean value of pixels neighboring a pixel to be interpolated and pixels on the locations to be interpolated in the previous field and the next field of the field to be interpolated, as the interpolation value of a frame.

A motion evaluation unit 174 evaluates the degree of motion using the MAD value of the current block calculated in the motion estimating unit 410 of FIG. 13.

A motion adaptation unit 178 sets the value of a pixel to be finally interpolated by adaptively calculating the output value of the motion-compensated interpolation unit 172 and the output value of the spatiotemporal interpolation unit 176 according to the degree of motion evaluated in the motion evaluation unit 174.

Therefore, the de-interlacing apparatus of FIG. 17 prevents the error which occurs when an inaccurate motion vector is used in the process for determining the presence of motion.

As described above, according to the present invention, by obtaining the bi-directional motion vector between two frames for a frame to be interpolated, overlaps and holes do not occur. Therefore, picture quality can be improved and particularly, panning or zooming images created by moving the camera can be efficiently processed. Also, noise on a time axis between fields, and flickers between lines, which occur in the conventional methods, can be reduced, and the ability to keep outlines is better than the existing de-interlacing methods. Also, by adaptively selecting between a motion-compensated interpolation value and a spatiotemporal interpolation value according to the degree of the motion of an input image, reliability of information regarding motion is enhanced as compared to the method which simply uses a motion-compensated interpolation value, and artifacts can be efficiently reduced.

What is claimed is:

1. A frame rate converting method comprising the steps of:
   (a) estimating a plurality of bi-directional motion vectors using motion vectors determined from a current frame and a previous frame;
   (b) determining an estimated bi-directional motion vector from step (a), corresponding to a neighboring block, that has the minimum error distortion from among the plurality of motion vectors estimated in step (a);
   (c) setting a motion vector of a current block to be the estimated bi-directional motion vector determined in step (b); and
   (d) forming a frame to be interpolated with the motion vector set in step (c).

2. The method of claim 1, wherein step (a) further comprises the sub-steps of:
   (a-1) detecting a motion vector between the current frame and the previous frame, and assigning the detected motion vector to the frame to be interpolated; and
   (a-2) adjusting the motion vector assigned in step (a-1) in the frame to be interpolated according to a block grid.

3. The method of claim 2, wherein the detecting in step (a-1) further comprises the sub-steps of:
   decimating an image; and
   estimating a motion vector from the decimated image.

4. The method of claim 2, wherein step (a-2) is for estimating a value, which has the minimum error among blocks of the previous frame and the current frame which linearly pass through the center of a block formed according to the block grid, as the bi-directional motion vector of the frame block to be interpolated in the frame to be interpolated.

5. The method of claim 1, further comprising:
   evaluating an accuracy of the motion vector of the current block in the frame to be interpolated.

6. The method of claim 1, further comprising:
   assigning an initial motion vector for the frame to be interpolated;
   evaluating the accuracy of the initial motion vector; and
   setting the motion vector of the neighboring block which has the minimum error distortion, as the motion vector of the current block.

7. The method of claim 1, wherein in step (d) the block to be interpolated is formed with the mean of blocks, using the estimated motion vector.

8. The method of claim 1, wherein in step (d) the block to be interpolated is extended and interpolated in an overlapped region with different weights.

9. A frame rate converter comprising:
   a bi-directional motion estimating unit operable to obtain a motion vector between a current frame and a previous frame, assign the motion vector to a frame to be interpolated, and estimate the assigned motion vector for a frame to be interpolated;
   a spatiotemporal smoothing unit operable to evaluate the accuracy of the motion vector of the current block in the frame to be interpolated in the bi-directional motion estimating unit, and set the motion vector of a neighboring block, which has the minimum error distortion, as the motion vector of the current block; and
   an interpolation unit operable to extend the block to be interpolated, and interpolate with the motion vector obtained in the spatiotemporal smoothing unit in an overlapped region with different weights.

10. A de-interlacing method comprising:
    (a) estimating bi-directional motion vectors using motion vectors determined from a previous field and a next field;
    (b) setting a motion vector of a pixel to be interpolated to be the motion vector estimated in step (a) that has a minimum neighboring error distortion; and
    (c) forming the pixel to be interpolated with the motion vector set in the step (b).

11. The de-interlacing method of claim 10, wherein step (a) further comprises the sub-steps of:
    (a-1) detecting the motion vector between the current field and the previous field, and assigning the motion vector to the field to be interpolated; and
    (a-2) adjusting the motion vector assigned in step (a-1) according to a block grid in the frame to be interpolated.

12. The de-interlacing method of claim 11, wherein step (a-2) further comprises:
    estimating a location value, which has the minimum error among blocks of the previous field and the current field which linearly pass through the center of a block formed according to the block grid in the field to be interpolated, as the bi-directional motion vector of the block of the field to be interpolated.

13. The de-interlacing method of claim 10, wherein step (b) further includes:
    evaluating the accuracy of the motion vector of the current block in the field to be interpolated; and
    setting the motion vector of a neighboring block which has the minimum error distortion, as the motion vector of the current block.

14. The de-interlacing method of claim 10, wherein step (b) further includes:
    adjusting the motion vector for the field to be interpolated;
    evaluating the accuracy of the motion vector of the current block; and
    setting the motion vector of a neighboring block which has the minimum error distortion, as the motion vector of the current block.

15. The de-interlacing method of claim 10, wherein in step (c) the pixel to be interpolated is formed with a mean of pixels, using the estimated motion vector in a field to be interpolated.

16. The de-interlacing method of claim 10, wherein in step (c) the median value of pixel values, to which the estimated motion vector is applied, of the previous field and the next field of the field to be interpolated, the mean value of the pixels, and the values of two pixels vertically neighboring a pixel to be interpolated, is set to the pixel to be interpolated.

17. The de-interlacing method of claim 10, wherein in step (c) the field to be interpolated takes the value of an original pixel where a line has data, and otherwise, takes the median value of a pixel value of the same location of an (n−1)-th field, a pixel value on the same location of an (n+1)-th field, values of pixels vertically neighboring the pixel to be interpolated in an n-th field, and the mean value of these pixel values.

18. A de-interlacing apparatus comprising:

a bi-directional motion estimating unit operable to obtain a motion vector between a current field and a previous field, assign the motion vector to a field to be interpolated, and estimate the assigned motion vector for a field to be interpolated;

a spatiotemporal smoothing unit operable to evaluate the accuracy of the motion vector of a current block in the field to be interpolated in the bi-directional motion estimating unit, and set the motion vector of a neighboring block, which has the minimum error distortion, as the motion vector of the current block; and a signal converting unit operable to form a pixel of a line without data, with the median value of pixel values obtained by applying the motion vector set in the spatiotemporal smoothing unit, the mean value of the pixel values, and the values of pixels vertically neighboring the pixel to be interpolated.

19. An adaptive de-interlacing apparatus comprising:

a motion evaluating unit operable to evaluate a degree of motion referring to the value of a motion vector of which error distortion between blocks of a previous field and a current field is the minimum;

a motion-compensated interpolation unit operable to interpolate using the mean of pixels to which bi-directional motion vectors detected for a pixel to be interpolated are applied, or interpolate using the median value of pixel values, to which a motion vector is applied, the mean value of the pixels, and the value between two pixels vertically neighboring the pixel to be interpolated;

a spatiotemporal interpolation unit operable to interpolate using the mean value of pixels neighboring the pixel to be interpolated and pixels to be interpolated in the previous field and the next field of the field to be interpolated; and a motion adaptation unit operable to adaptively select between the interpolation value of the motion-compensated interpolation unit and the interpolation value of the spatiotemporal interpolation unit according to a degree of motion evaluated in the motion evaluating unit.

20. An adaptive frame rate converter comprising:

a motion evaluating unit for evaluating a degree of motion referring to a value of a motion vector of which error distortion between blocks of a previous frame and a current frame is the minimum;

a motion-compensated interpolation unit for interpolating with the mean of pixels to which bi-directional motion vector detected for a frame to be interpolated is applied;

a spatiotemporal interpolation unit for interpolating with the mean value of pixels neighboring the pixel to be interpolated and pixels to be interpolated in the previous frame and the next frame of the frame to be interpolated; and a motion adaptation unit for adaptively selecting between the interpolation value of the motion-compensated interpolation unit and the interpolation value of the spatiotemporal interpolation unit according to the degree of motion evaluated in the motion evaluating unit.

* * * * *